(12) United States Patent
Haynes

(10) Patent No.: US 11,680,910 B2
(45) Date of Patent: Jun. 20, 2023

(54) OPTICAL MEASUREMENT DEVICE FOR INSPECTION OF DISCONTINUITIES IN AEROSTRUCTURES

(71) Applicant: SPIRIT AEROSYSTEMS, INC., Wichita, KS (US)

(72) Inventor: Mark Davis Haynes, Andover, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 339 days.

(21) Appl. No.: 16/943,205

(22) Filed: Jul. 30, 2020

(65) Prior Publication Data

US 2020/0355619 A1  Nov. 12, 2020

Related U.S. Application Data

(62) Division of application No. 15/786,213, filed on Oct. 17, 2017, now Pat. No. 10,837,916.

(Continued)

(51) Int. Cl.
  *G01N 21/88* (2006.01)
  *G01B 17/02* (2006.01)
  (Continued)

(52) U.S. Cl.
  CPC ......... *G01N 21/8851* (2013.01); *G01B 17/02* (2013.01); *G01B 17/025* (2013.01);
  (Continued)

(58) Field of Classification Search
  CPC ........... G01N 21/8851; G01N 21/8422; G01N 21/8806; G01N 21/9515;
  (Continued)

(56) References Cited

U.S. PATENT DOCUMENTS 9,645,012 B2   5/2017  Marsh et al.
2007/0077502 A1*  4/2007  Moriya ............ G02F 1/133514
                                                    430/7

(Continued)

FOREIGN PATENT DOCUMENTS

JP    01321343    12/1989
JP    09042950    2/1997
WO    2014105291  7/2014

OTHER PUBLICATIONS

Office Action dispatched on Oct. 12, 2021 in related JP application No. 2018-042167, 12 pages.

*Primary Examiner* — John W Lee
(74) *Attorney, Agent, or Firm* — Hovey Williams LLP

(57) ABSTRACT

A handheld device for making 3D topography measurements of surface discontinuities in high performance structures, such as aerostructures (e.g., aluminum fuselages). Lights illuminate the discontinuity from multiple angles, and a camera captures images of the discontinuity. A thickness sensor generates thickness data regarding a thickness of the base material and the top protective coating. A position sensor generates position data regarding a location of the discontinuity on the structure. A processor generates geometry data regarding a geometry of the discontinuity based on the images, performs an analysis of the geometry, thickness, and position data, and communicates a result of the analysis on a display. A conforming membrane and/or a gel and an opaque lubricant may be applied over and conform to the discontinuity in order to make more uniform a reflectivity difference and a color difference between the discontinuity and an adjacent portion of the structure.

20 Claims, 12 Drawing Sheets

Related U.S. Application Data

(60) Provisional application No. 62/469,270, filed on Mar. 9, 2017.

(51) Int. Cl.
*G01N 21/84* (2006.01)
*G06F 3/14* (2006.01)
*G06T 7/00* (2017.01)
*G01N 21/95* (2006.01)

(52) U.S. Cl.
CPC ..... *G01N 21/8422* (2013.01); *G01N 21/8806* (2013.01); *G06F 3/14* (2013.01); *G06T 7/0004* (2013.01); *G01N 21/9515* (2013.01); *G01N 2021/8427* (2013.01); *G01N 2021/8893* (2013.01); *G01N 2201/0221* (2013.01); *G06T 2207/10028* (2013.01); *G06T 2207/30164* (2013.01); *G06T 2207/30252* (2013.01)

(58) Field of Classification Search
CPC ... G01N 2021/8427; G01N 2021/8893; G01N 2201/0221; G01B 17/02; G01B 17/025; G06F 3/14; G06T 7/0004; G06T 2207/10028; G06T 2207/30164; G06T 2207/30252
See application file for complete search history.

(56) References Cited

U.S. PATENT DOCUMENTS

| | | | |
|---|---|---|---|
| 2008/0075322 A1* | 3/2008 | Dube | G06V 20/693 382/100 |
| 2008/0165266 A1* | 7/2008 | Jenkins | G06F 3/0425 348/E5.022 |
| 2013/0050470 A1* | 2/2013 | Kazama | G01N 21/8901 348/92 |
| 2013/0216122 A1* | 8/2013 | Zhou | G06T 7/0004 382/149 |
| 2014/0193064 A1* | 7/2014 | Couse | G01N 21/8851 382/141 |
| 2015/0381965 A1* | 12/2015 | Atanassov | H04N 13/239 348/47 |
| 2017/0052070 A1* | 2/2017 | Marsh | G06T 7/40 |
| 2022/0352437 A1* | 11/2022 | Song | H01L 25/167 |

* cited by examiner

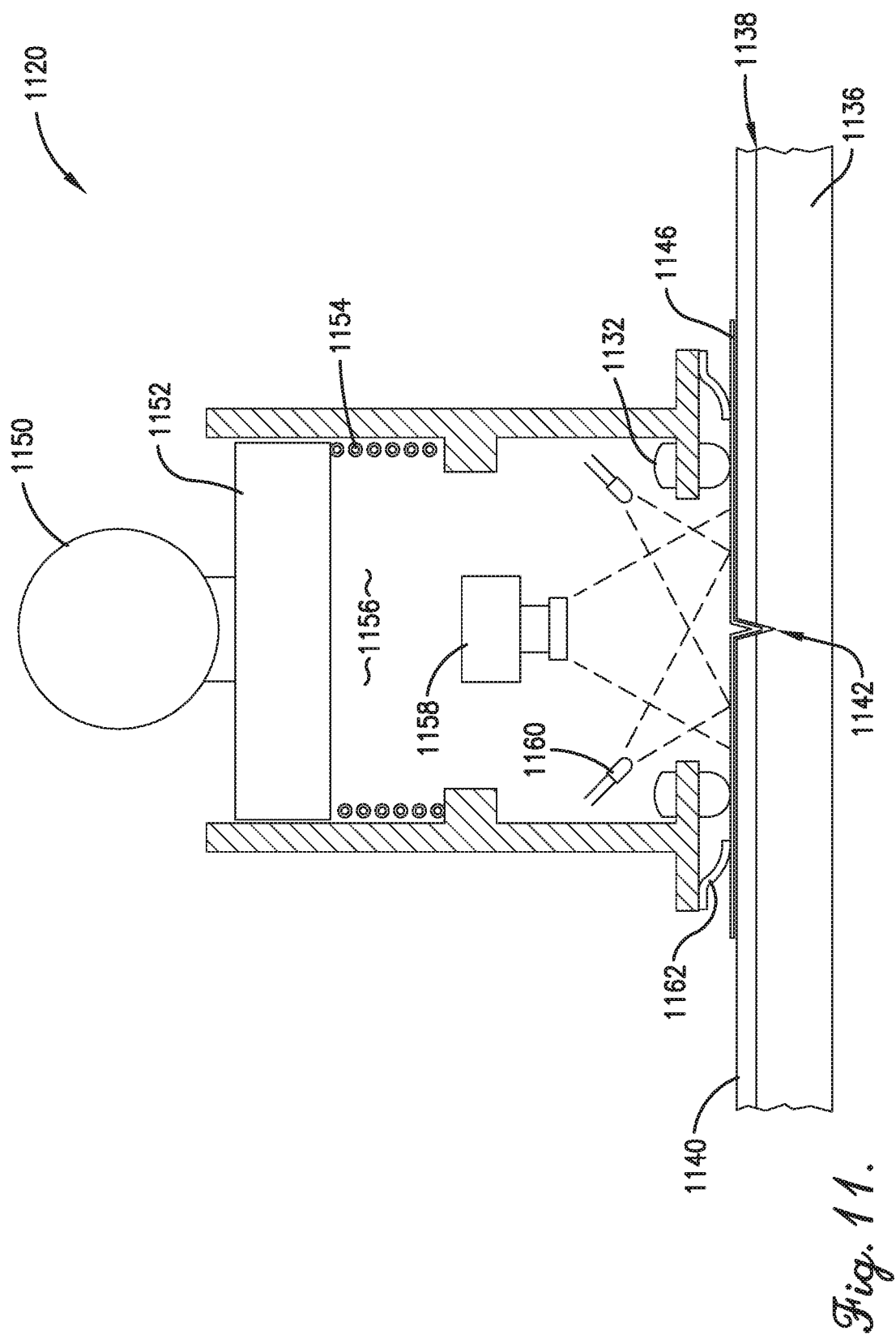

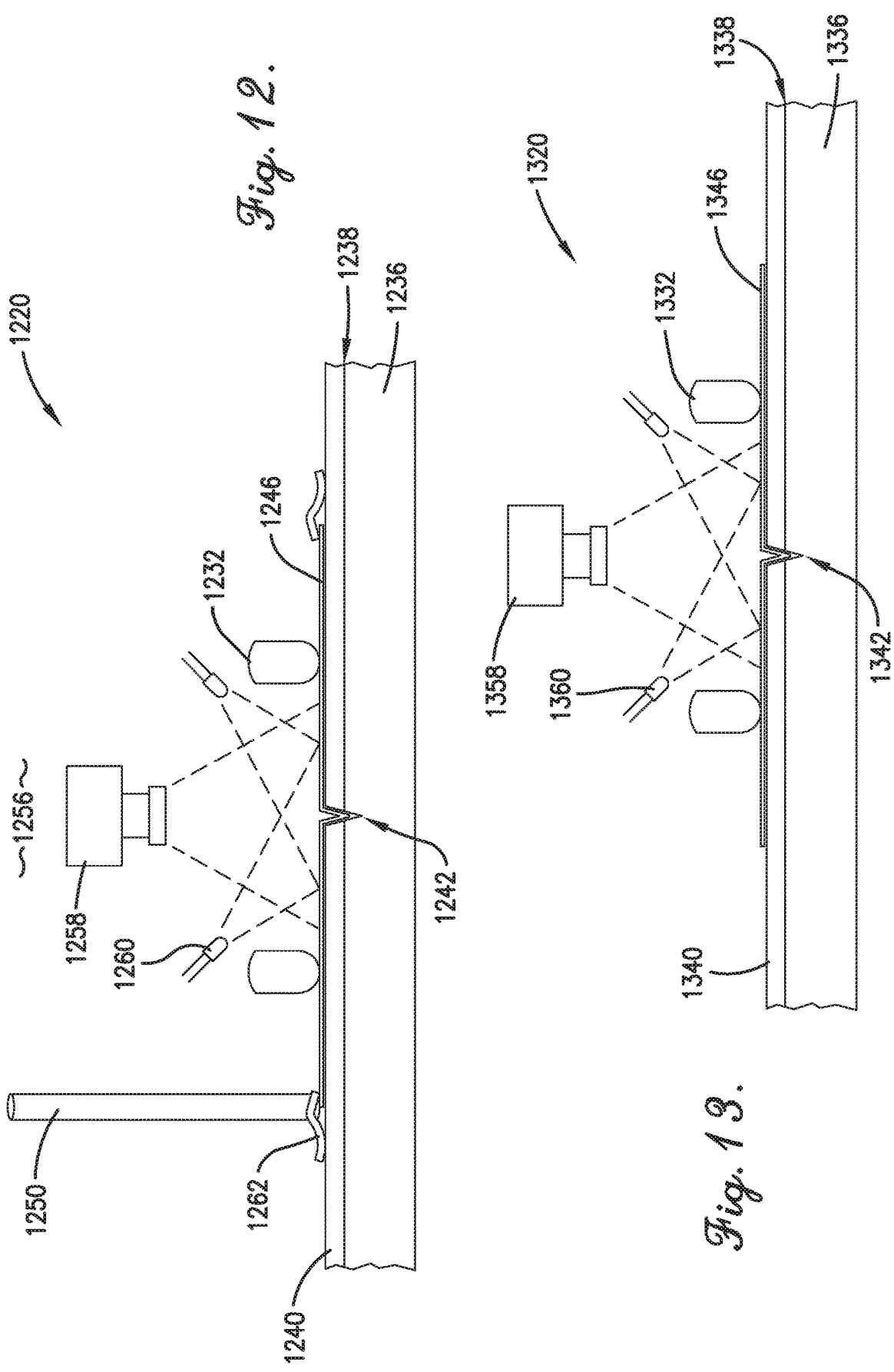

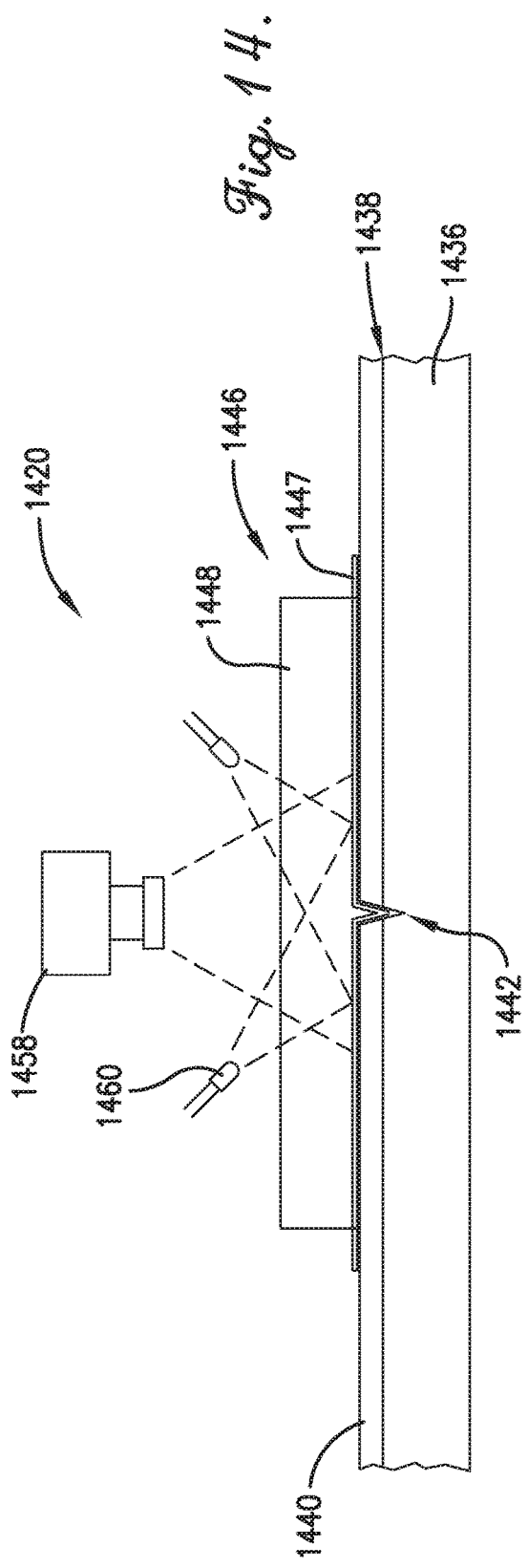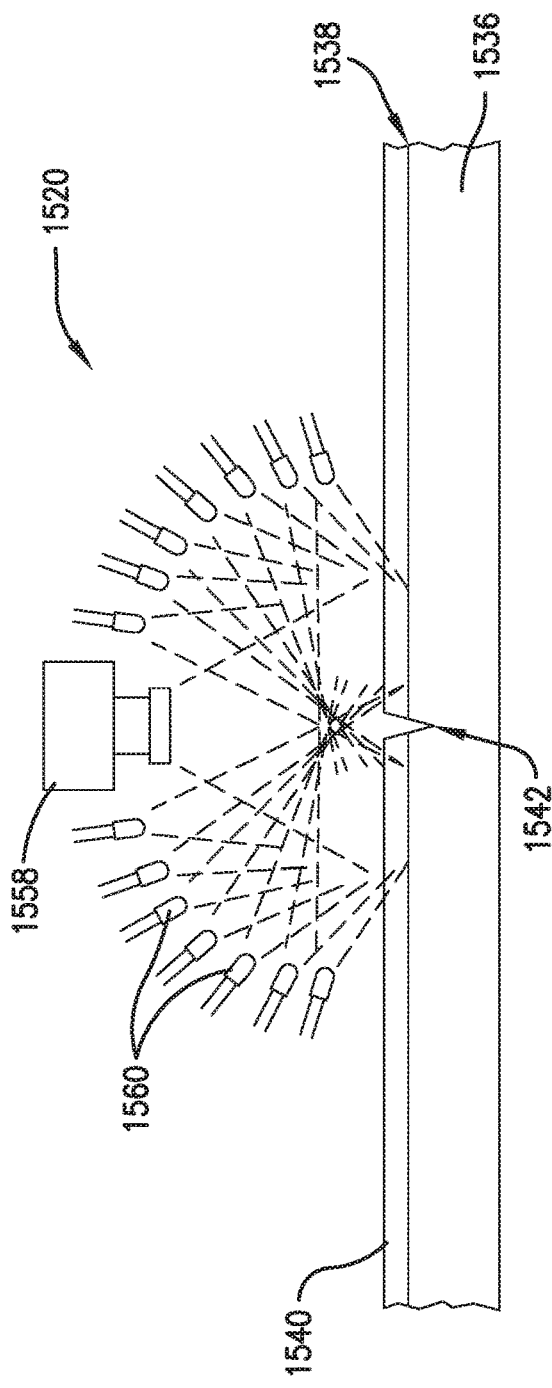

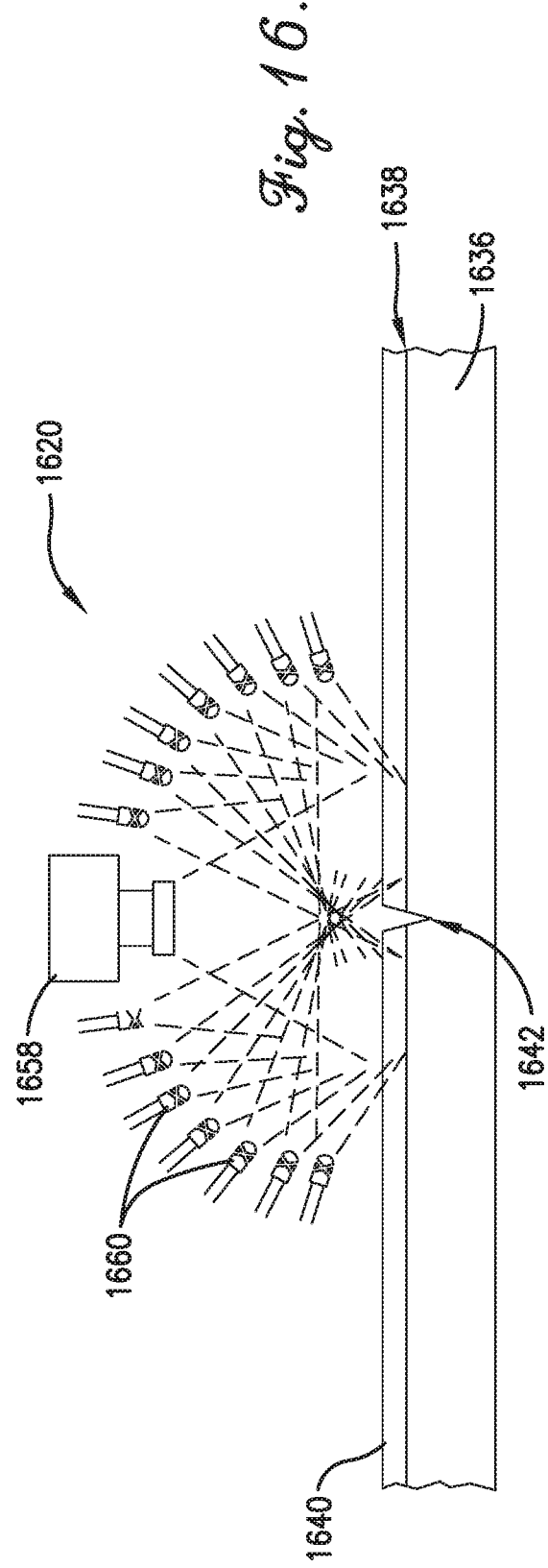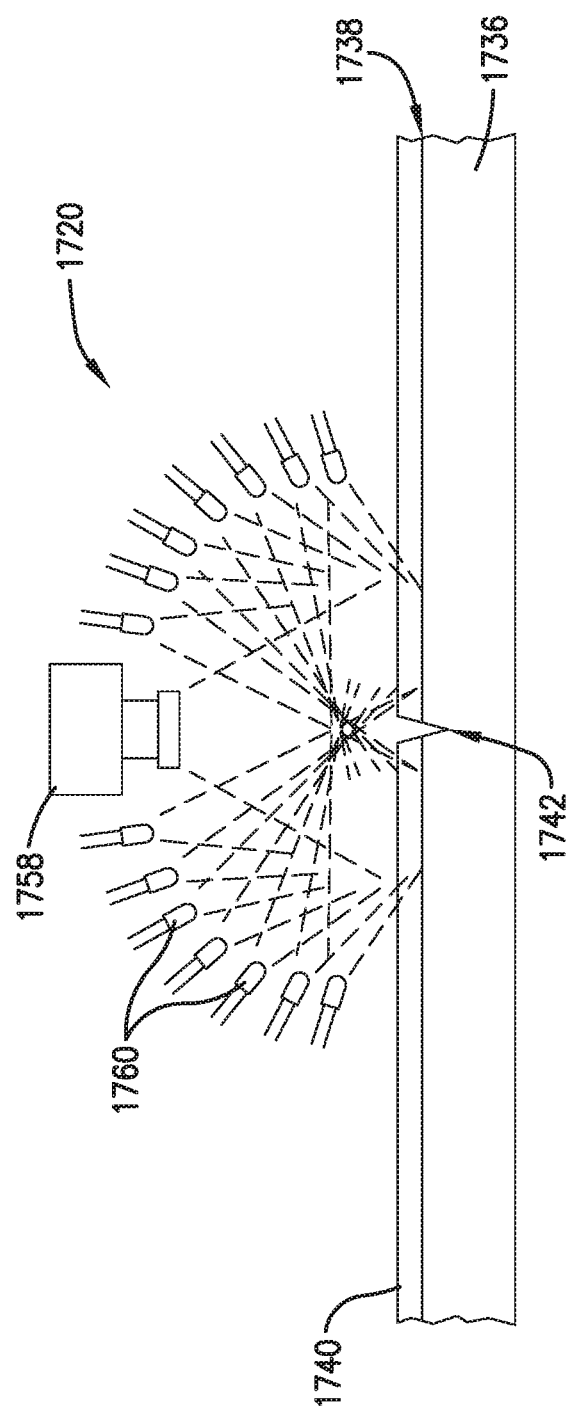

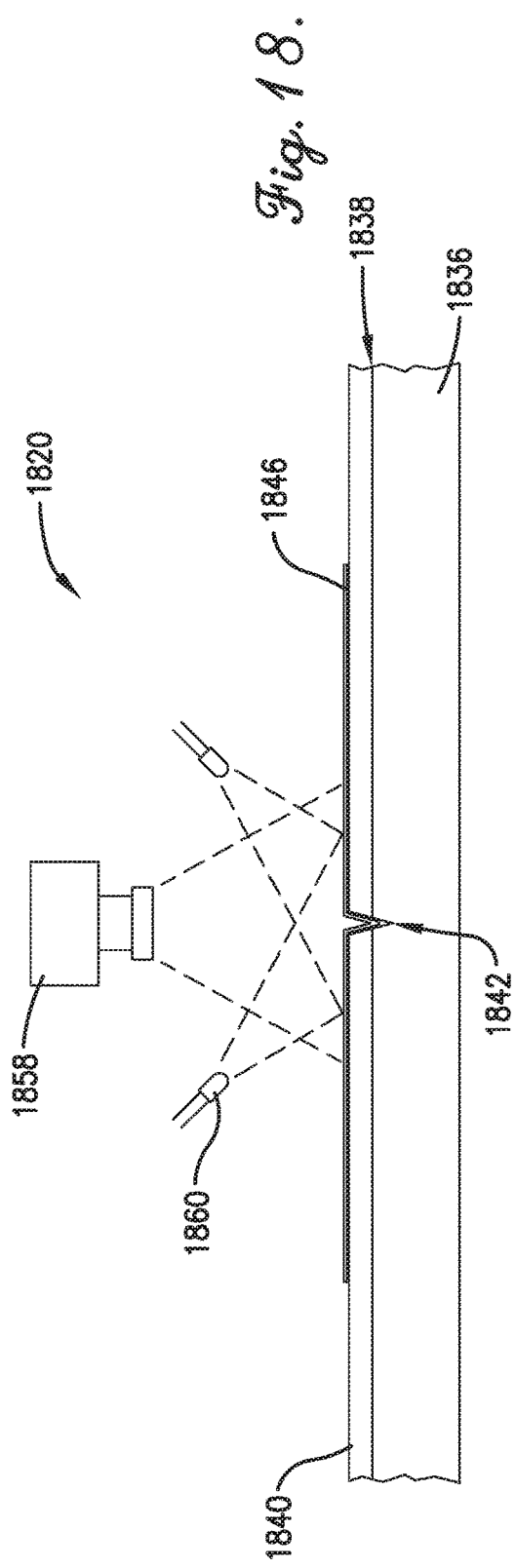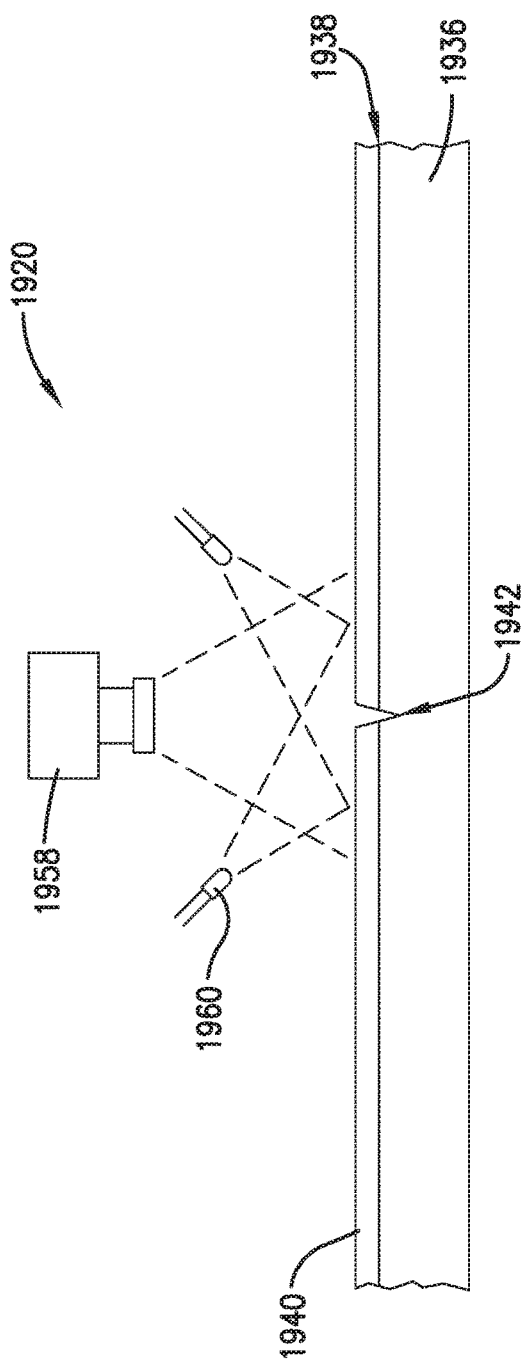

OPTICAL MEASUREMENT DEVICE FOR INSPECTION OF DISCONTINUITIES IN AEROSTRUCTURES

RELATED APPLICATIONS

The present U.S. non-provisional patent application is a divisional and claims priority of an earlier-filed U.S. non-provisional patent application of the same title, Ser. No. 15/786,213, filed Oct. 17, 2017, and of an earlier-filed U.S. provisional patent application of the same title, Ser. No. 62/469,270, filed Mar. 9, 2017. The entire contents of the identified earlier-filed applications are incorporated by reference as if fully set forth herein.

FIELD

The present invention relates to devices for measuring discontinuities in high performance structures, and more particularly, embodiments concern a handheld device for making three-dimensional topography measurements and facilitating inspection and evaluation of surface discontinuities in high performance structures, such as aerostructures, in production and maintenance environments.

BACKGROUND

It is desirable during the production and subsequent maintenance of high performance structures, such as aerostructures, to measure surface discontinuities. For example, discontinuities can occur throughout the assembly of aircraft fuselages, and discontinuities that do not meet established requirements may have to be reworked or the affected piece may have to be scrapped. Existing technologies are able to provide single-point or two-dimensional measurements of discontinuity depth, but do not have the accuracy, repeatability, or speed to adequately measure surface discontinuities in production and maintenance environments.

For example, a known technique for determining the depth of a discontinuity in a piece involves capturing multiple images of the piece lit from multiple angles, and then comparing the images and estimating the depth of the discontinuity based on the characteristics of shadows. However, the use and accuracy of this technique can be negatively affected by the different reflectivities of and glare produced by the matte temporary protective coating (TPC) applied over the surface of the piece and the much brighter exposed metal within the discontinuity. Further, it is generally desirable to measure the depth of the discontinuity from the bottom of the discontinuity to the top of the metal surface, not to the top of the overlying TPC. In fact, the thickness of the TPC may be between three-thousandths and five-thousandths of an inch, which may be as much as three to five times the depth of the discontinuity. Thus, a known technique involves removing the TPC around the discontinuity, measuring the discontinuity, and then reapplying the TPC, all of which requires a significant amount of time and effort.

This background discussion is intended to provide information related to the present invention which is not necessarily prior art.

SUMMARY

Embodiments of the present invention solve the above-described and other problems and limitations by providing a handheld device for making three-dimensional (3D) topography measurements and facilitating inspection and evaluation of surface discontinuities in high performance structures, such as aerostructures (e.g., aluminum fuselages), with higher resolution, greater accuracy, and increased repeatability, and which is suitable for use in production and/or maintenance environments. Further, the device advantageously allows for quickly and easily measuring the depth of a discontinuity from the bottom of the discontinuity to the top of the metal surface without requiring that the TPC overlaying the metal surface be removed and reapplied.

In a first embodiment of the present invention, a handheld device is provided for facilitating an evaluation of a surface discontinuity in a structure, wherein the structure includes a base material and a top protective coating applied over a surface of the base material. The device may comprise one or more light sources, a digital camera, a thickness sensor, and an electronic processing component. The light sources may be configured to illuminate the discontinuity from one or more angles, and the digital camera may be configured to capture one or more images of the discontinuity illuminated by the light sources. The thickness sensor may be configured to generate thickness data regarding a thickness of at least one of the base material and the top protective coating. The processing component may be configured to generate geometry data regarding a geometry of the discontinuity based on the images of the discontinuity, perform an analysis of the geometry data and the thickness data, and visually communicate a result of the analysis on a display.

In a second embodiment, a handheld device is provided for facilitating an evaluation of a surface discontinuity in a structure, wherein the structure includes a base material and a top protective coating applied over a surface of the base material. The device may comprise a conforming membrane, a pressurization mechanism, one or more light sources, a digital camera, a thickness sensor, and an electronic processing component. The conforming membrane may have two sides and be configured to be applied over the discontinuity and to conform to the discontinuity and make more uniform a reflectivity difference and a color difference between the discontinuity and an adjacent portion of the structure. The pressurization mechanism may be configured to create a pressure differential between the two sides of the conforming membrane so as to urge the conforming membrane into closer contact with the surface discontinuity. The light sources may be configured to illuminate the discontinuity from one or more angles, and the digital camera may be configured to capture one or more images of the discontinuity illuminated by the light sources. The processing component may be configured to generate geometry data regarding a geometry of the discontinuity based on the images of the discontinuity, perform an analysis of the geometry data, and visually communicate a result of the analysis on a display.

In a third embodiment, a handheld device is provided for facilitating an evaluation of a surface discontinuity in a structure, wherein the structure includes a base material and a top protective coating applied over a surface of the base material. The device may comprise a gel and an opaque lubricant, one or more light sources, a digital camera, a thickness sensor, and an electronic processing component. The gel and the opaque lubricant may be configured to be applied over the discontinuity and to conform to the discontinuity and make more uniform a reflectivity difference and a color difference between the discontinuity and an adjacent portion of the structure. The light sources may be configured to illuminate the discontinuity from one or more angles, and the digital camera may be configured to capture one or more images of the discontinuity illuminated by the light sources. The processing component may be configured to generate geometry data regarding a geometry of the discontinuity based on the images of the discontinuity, perform an analysis of the geometry data, and visually communicate a result of the analysis on a display.

Various implementations of the foregoing embodiments may include any one or more of the following additional or alternative features. The one or more light sources may be a plurality of light sources arranged to illuminate the discontinuity from a plurality of angles. The geometry of the discontinuity may include a depth below and/or a height above the surface of the base material. The thickness sensor may be an ultrasonic transducer. The thickness sensor may measure an average thickness of at least one of the base material and the top protective coating of an area around the discontinuity. The analysis performed by the processing component may include determining a true depth of the discontinuity below the surface of the base material by subtracting the thickness of the top protective coating provided by the thickness data from a depth of the discontinuity provided by the geometry data. The analysis may include determining a criticality of the discontinuity by subtracting the true depth of the discontinuity from the thickness of the base material to produce a criticality result. Determining the criticality of the discontinuity may include comparing the criticality result to a pre-established maximum criticality value. Determining the criticality may further include considering a nature of the base material, a nature of the structure, and a force that the structure may experience during use. The processing component may be further configured to, based on the analysis, automatically make a determination of whether the discontinuity should be repaired, and to visually communicate the determination on the display. The geometry data may include a plurality of data points forming a three-dimensional point cloud providing three-dimensional topography data of the discontinuity. The result of the analysis communicated on the display may include the true depth of the discontinuity and a cross-sectional elevation view of the discontinuity.

The device may further include a conforming element having two sides and being configured to be applied over the discontinuity and to conform to the discontinuity and make more uniform a reflectivity difference and a color difference between the discontinuity and an adjacent portion of the structure. The conforming element may be an elastomeric membrane. The device may further include a pressurization mechanism configured to create a pressure differential between the two sides of the elastomeric membrane so as to urge the elastomeric membrane toward the structure to increase conformance of the elastomeric membrane to the discontinuity. The device may further include a position sensor configured to generate position data regarding a location of the discontinuity on the structure. The position sensor may be a wireless three-dimensional positional tracker configured to determine the location of the discontinuity based on signals received from a plurality of local transmitters.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 11 is a fragmentary cross-sectional elevation view of a first alternative implementation of the device;

FIG. 12 is a fragmentary cross-sectional elevation view of a second alternative implementation of the device;

FIG. 13 is a fragmentary cross-sectional elevation view of a third alternative implementation of the device;

FIG. 14 is a fragmentary cross-sectional elevation view of a fourth alternative implementation of the device;

FIG. 15 is a fragmentary cross-sectional elevation view of a fifth alternative implementation of the device;

FIG. 16 is a fragmentary cross-sectional elevation view of a sixth alternative implementation of the device;

FIG. 17 is a fragmentary cross-sectional elevation view of a seventh alternative implementation of the device;

FIG. 18 is a fragmentary cross-sectional elevation view of an eighth alternative implementation of the device; and FIG. 19 is a fragmentary cross-sectional elevation view of a ninth alternative implementation of the device.

Figure 1B:
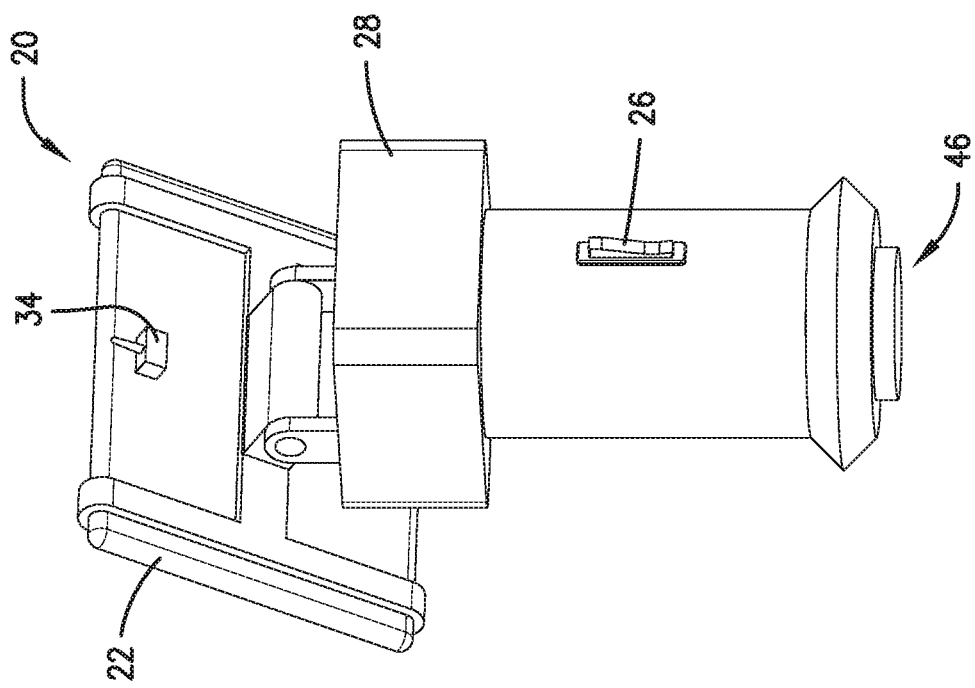
FIGS. 1A and 1B are, respectively, front and back isometric views of an embodiment of a device for making 3D topography measurements of a surface.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a handheld device for making three-dimensional (3D) topography measurements and facilitating inspection and evaluation of surface discontinuities in high performance structures, such as aerostructures (e.g., aluminum fuselages), with higher resolution, greater accuracy, and increased repeatability, and which is suitable for use in production and/or maintenance environments. Further, the device advantageously allows for quickly and easily measuring the true depth of a discontinuity from the bottom of the discontinuity to the top of the metal surface without requiring that the TPC overlaying the metal surface be removed and reapplied. The device may be configured to measure substantially any type of discontinuity, such as scratches, drill runs, gouges, drill marks, dents, layovers, pits, and/or drill starts, having depths of between one-thousandths and thirty-thousandths of an inch. In one implementation, the device may be further configured to measure the height of a discontinuity, such as the head height of a rivet or other fastener, which if too high, could interfere with laminar flow across the surface of the structure.

Broadly characterized, embodiments of the device may function as follows. Lights may illuminate the discontinuity from multiple angles, and a camera may capture images of the discontinuity. A thickness sensor may generate thickness data regarding a thickness of the base material and the top protective coating. A processor may generate geometry data regarding a geometry of the discontinuity based on the images, perform an analysis of the geometry, thickness, and position data, and communicate a result of the analysis on a display. Further, a conforming element (e.g., a membrane and/or a gel and an opaque lubricant and/or a transparent gel having an opaque surface layer) may be applied over and conform to the discontinuity in order to make more uniform a reflectivity difference and a color difference between the discontinuity and an adjacent portion of the structure.

Figure 1A:
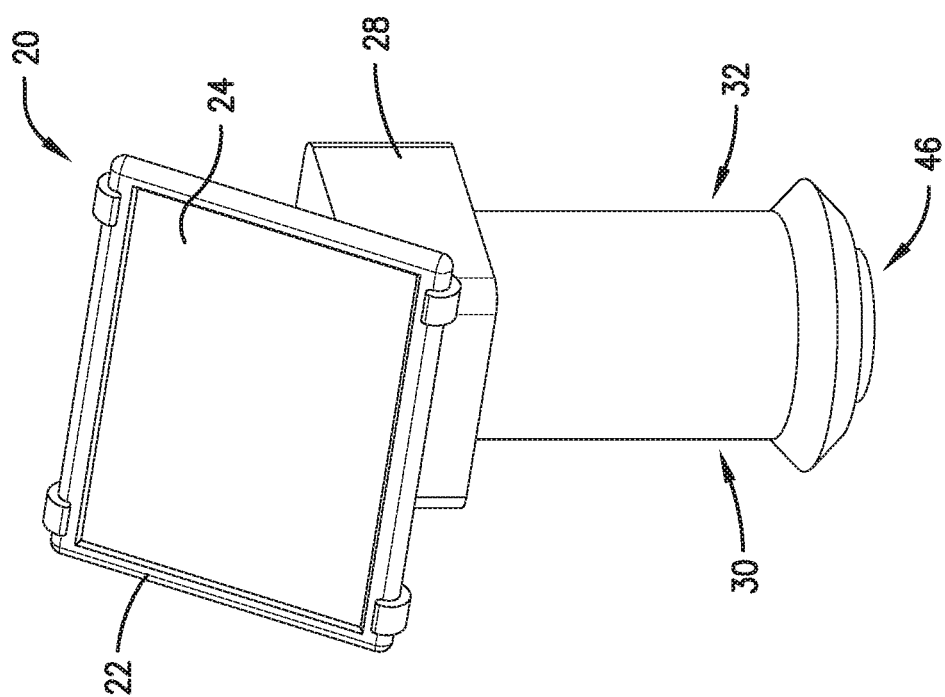

Referring to FIGS. 1A and 1B, an embodiment of the device 20 may broadly comprise a processing component 22, a display 24, a trigger 26, a power source 28, a conforming element 46, a TPC and/or base material sensor 32, and a position sensor 34. Some or all of these components may be integrated into a handheld unit to provide a highly portable, automated, complete 3D measurement workflow useable in production and/or maintenance environments.

The processing component 22 may be substantially any suitable combination of electronic memory and electronic processor configured to receive, store, and analyze data from the images and the TPC and/or base material sensors 32, and provide a report for presentation on the display 24. The display 24 may be substantially any suitable visual display device configured to present the output generated by the processing component 22. In one implementation, the processing component 22 and the display 24 may be provided in the form of a tablet computer or a single board computer (SBC) integrated into or attached to the handheld unit. The trigger 26 may be substantially any suitable trigger or other switching mechanism configured to allow the user to initiate operation of the device 20. The power source 28 may be substantially any suitable power source configured to power operation of the device 20. In one implementation, the power source may be a rechargeable battery integrated into the handheld unit.

One or more light sources (described below) may illuminate the discontinuity from multiple angles, and a digital camera (described below) may generate digital images of the illuminated discontinuity, and the images may be analyzed to determine the geometry of the discontinuity. The conforming element 46 may be configured to improve these images, including allow for determining the depths (and/or heights) and/or volumes of the discontinuity with submicron accuracy, of the structure regardless of its optical properties, thereby ensuring accuracy, repeatability, and consistent performance, even for optically complex surfaces. In particular, the conforming element 46 may make reflectivity and color more uniform and reduce glare. Further, the conforming element 46 may provide fast acquisition, thereby avoiding measurement drift, reducing sensitivity to vibration, and eliminating sensitivity to environmental changes (e.g., temperature). The conforming element 46 may be, for example, an elastomeric or other membrane and/or a gel and/or an opaque lubricant. A suitable conforming element for use with the present invention may be the transparent gel with opaque surface layer forming part of the GelSight sensor product available from GelSight, Inc. The GelSight technology is the subject of several patents and published patent applications, including U.S. Pat. No. 8,411,140, titled "Tactile sensor using elastomeric imaging," U.S. Pat. Nos. 9,127,938 and 9,538,056, both titled "High-Resolution Surface Measurement Systems and Methods," U.S. Pat. App. Pub. No. 2014/0104395, titled "Methods of and Systems for Three-Dimensional Digital Impression and Visualization of Objects Through an Elastomer," and U.S. Pat. App. Pub. No. 2014/0253717, titled "Continuous Contact-Based Three-Dimensional Measurement," as well as other published papers, including webpages. Various implementations of the conforming element 46 may include an elastomeric membrane but not a gel, a gel and possibly an opaque lubricant but not an elastomeric membrane, both an elastomeric membrane and a gel, or neither an elastomeric membrane nor a gel but rather some other conforming technology (such as any of the several thin layer technologies which may be used in the eighth alternative implementation described below and shown in FIG. 18).

The TPC and/or base material sensor 32 may be substantially any suitable sensor configured to measure the thickness of the TPC coating and/or the thickness of the underlying metal or other base material. In one implementation, the TPC and/or base material sensor may be an ultrasonic transducer configured to measure an average thickness over a relatively large area, which can minimize the effects of any local deviations in TPC and/or base material thicknesses. If the TPC and/or base material sensor 32 is used in conjunction with a transparent gel or elastomeric based conforming element such as the GelSight gel, the conforming element 46 may be used to propagate ultrasonic waves between the sensor and the TPC coating and/or base material. In such cases, it may be beneficial to introduce a couplant 48 between the conforming element and the TPC and/or base material to facilitate transmission of ultrasonic waves. In another implementation, the TPC and/or base material sensor may be an eddy current sensor configured to measure electromagnetic flux. Some embodiments may not measure the TPC but measure the base material, while other embodiments may measure the TPC but not measure the base material, and still other embodiments may employ separate sensors for measuring the TPC and the base material.

The position sensor 34 may be substantially any suitable sensor configured to determine a location of the discontinuity on the piece or on a larger structure (e.g., an aircraft) of which the piece is a part. In one implementation, the position sensor 34 may be a wireless 3D positional tracker configured to determine its location based on signals received from local transmitters, and the location of the discontinuity may be equated with or easily determined based on the location of the position sensor 34. The location of the discontinuity may be saved in electronic memory for later retrieval and consideration. In particular, the location of the discontinuity on the piece may be useful for determining the criticality of the discontinuity (and whether it should be repaired it), and for tracking the discontinuity and any changes to it over time. Some embodiments may not include the position sensor 34.

Figure 2:
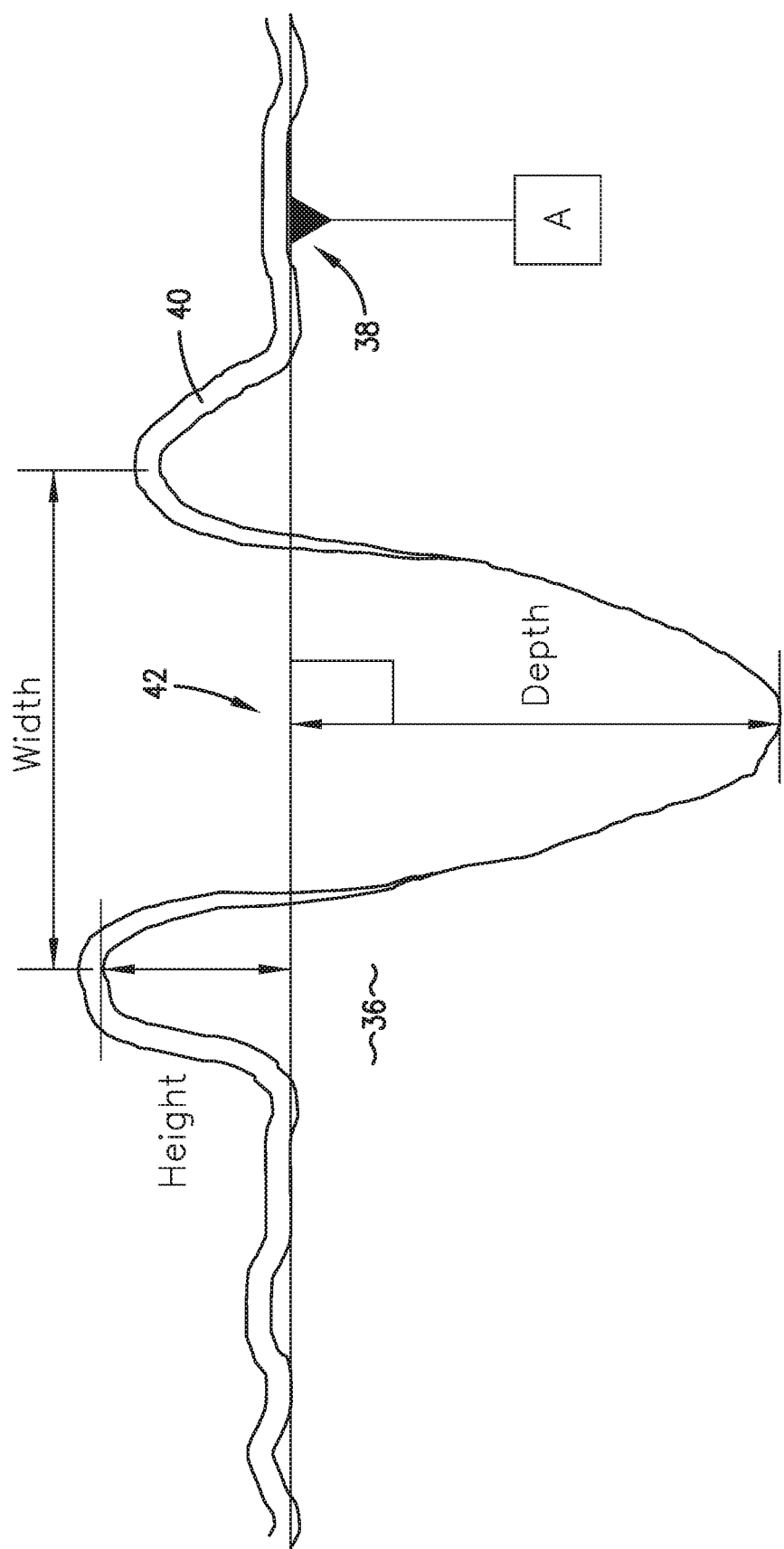
FIG. 2 is a fragmentary cross-sectional elevation depiction of a discontinuity in the surface.

Referring also to FIG. 2, a piece 36 may have a surface 38 coated with a TPC 40, and a discontinuity 42 may extend through the TPC 40 and into the base material of the piece 36. During operation of the device 20, the TPC and/or base material sensor 32 may measure the thickness of the TPC 40. The processing component 22 may receive the images of the illuminated discontinuity 42, generate geometry data regarding a geometry of the discontinuity based on the images, and perform an analysis of the geometry and thickness data, and communicate a result of the analysis on the display 24. The analysis may include subtracting the thickness of the TPC 40 from the determined depth of the discontinuity 42 to arrive at the desired depth measurement—the "true" depth of the discontinuity 42—from the bottom of the discontinuity 42 to the top of the surface 38 of the piece 36. Thus, the device 20 advantageously measures the true depth of the discontinuity 42 without requiring that the TPC 40 be removed and then reapplied, thereby saving time and money and improving quality. Additionally, the processing component 22 may calculate a true volume of the discontinuity. Additionally, the TPC and/or base material sensor 32 may measure the thickness of the base material, and the processing component 22 may determine, based at least on the true depth of the discontinuity and the thickness of the base material into which the discontinuity extends, whether the discontinuity is sufficiently significant to warrant repair or replacement of the base material. Other considerations may include the natures (e.g., performance characteristics) of the base material and/or the piece 36, and the forces that the piece 36 may experience during use.

In more detail, the processing component 22 may determine a criticality of the discontinuity by subtracting the true depth of the discontinuity from the thickness of the base material to produce a criticality result. Determining the criticality may include comparing the criticality result to a pre-established maximum criticality value, and/or considering a nature of the base material, a nature of the structure, and a force that the structure may experience during use.

Additionally, the processing component 22 may automatically determine whether the discontinuity should be repaired, and communicate the determination to a user of the device 20 or other responsible party. Evaluating the discontinuity to make the determination may involve the use of machine learning. More specifically, the processing component 22 may, through conventional machine learning techniques, learn how to validly and reliably determine whether the discontinuity should be repaired. The resulting determinations by the processing component 22 may be more objective and reliable than determinations by some human users.

Air between the conforming element 46 and the piece 36 can adversely impact the accuracy of measurements. One solution is for the user to forcibly push the element 46 onto the piece 36. However, eliminating air from deep discontinuities could require twenty or more pounds of force, and applying that much force could quickly tire the user and cause the user's hands to shake, which could adversely impact the accuracy of measurements. Embodiments of the device 20 may include any one or more of the following solutions to this problem.

Figure 3:
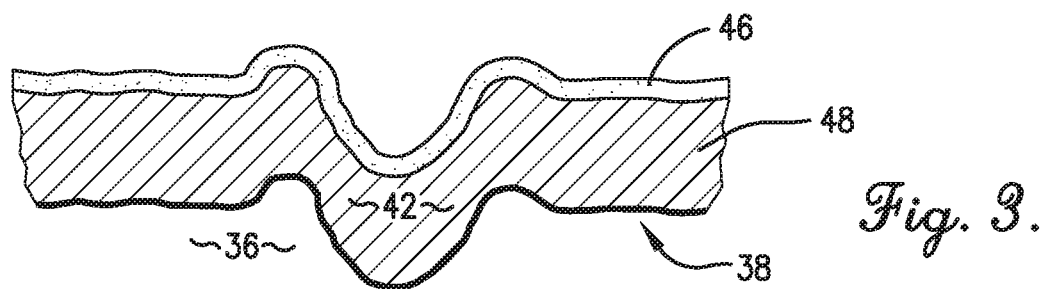
FIG. 3 is a fragmentary cross-sectional elevation depiction of the device positioned over the discontinuity, wherein the device incorporates a first solution for eliminating air between the device and the surface.
Figure 4:
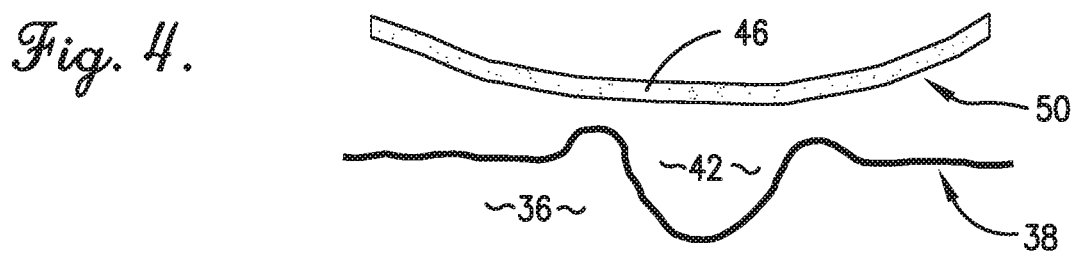
FIG. 4 is a fragmentary cross-sectional elevation depiction of the device positioned over the discontinuity, wherein the device incorporates a second solution for eliminating air between the device and the surface.
Figure 5:
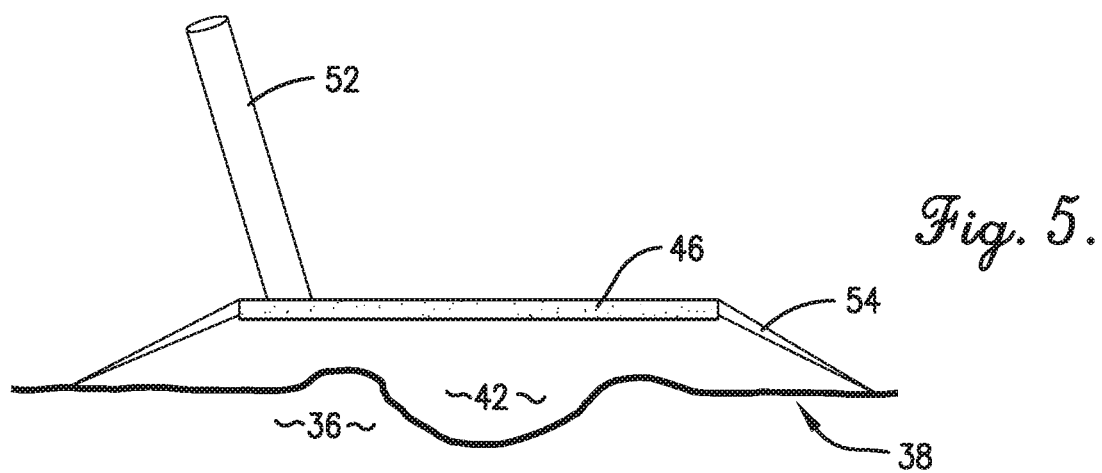
FIG. 5 is a fragmentary cross-sectional elevation depiction of the device positioned over the discontinuity, wherein the device incorporates a third solution for eliminating air between the device and the surface.

Referring to FIG. 3, a first solution involves applying a couplant 48, which may also serve as a lubricant, to the piece 36. The couplant 48 aids in eliminating air between the element 46 and the piece 36, and as the element 46 may stick to metal surfaces and even to TPC coatings, the lubricating properties of the couplant allow the device 20 to more easily slide across the surface 38 of the piece 36 and makes it easier for the user to center the device 20 over the feature to be measured. Referring to FIG. 4, a second solution involves providing the element 46 with a convex shape 50. This convex shape 50 allows for better eliminating air between the element 46 and the piece 36 than do existing planar shapes. Referring to FIG. 5, a third solution involves applying a vacuum 52 to reduce or eliminate air and thereby create a pressure differential between the element 46 and the piece 36 so that the element 46 conforms more closely to the piece 36 and to the discontinuity 42. This may require providing a sealing skirt or gasket 54 around a periphery of the element 46 to support the creation and maintenance of the vacuum, and pumping air out of the space between the element 46 and the piece 36. Again, any or all of these solutions may be combined to achieve the desired results.

Embodiments of the device 20 may achieve "objective tactility," wherein tactility (T) is a binary decision based on width (W), height (H), and depth (D). The equation T(W, H,D) is determinant and can be found through multivariate regression analysis given a sample set of discontinuities. Through statistical analysis it can be determined with a known confidence interval that the device 20 evaluates a discontinuity as being tactile.

The minimum repeatability and reproducibility of the device 20 may depend on the critical threshold for the depth of the discontinuity 42. For example, if the critical threshold is one-thousandths of an inch, and assuming a tolerance consumption allowance of four-to-one, then the minimum repeatability and reproducibility of the device 20 may be no greater than twenty-five microinches, but may be closer to one hundred microinches. The cycle time of the device 20, which is the period from the start of the measurement process to the presentation of the results to the user on the display 24, may be one minute or less, or fifteen seconds or less, or between five and fifteen seconds.

Figure 6:
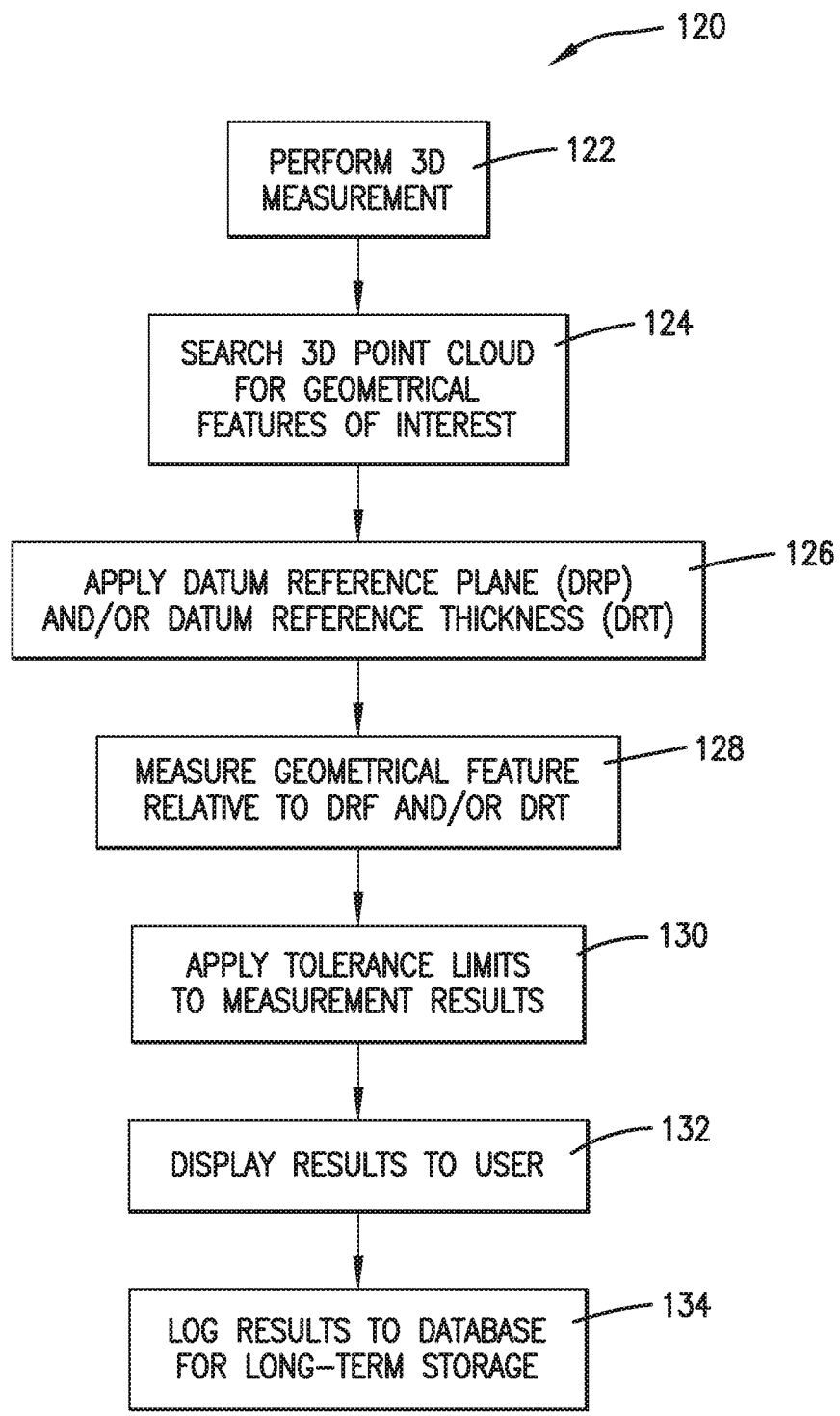
FIG. 6 is a high-level flowchart of actions performed by the device during operation.

Referring also to FIG. 6, a high-level flowchart 120 of aspects of operation of the device 20 is shown. Once the device 20 is triggered, the camera may generate images of the illuminated surface 38 of the piece 36, and the processing component 22 may generate a 3D point cloud of data based on the images, as shown in 122. The device 20 may search the 3D point cloud for any geometrical features of interest (i.e., the discontinuity 42), as shown in 124. The device 20 may use the TPC and/or base material sensor 32 to measure the reference surface 38 (the "datum reference plane" (DRT)) below the TPC 40 and/or to measure the thickness of the base material (the "datum reference thickness" (DRT)), as shown in 126. The processing component 22 may generate geometry data (e.g., 3D topography data) regarding a geometry of the discontinuity 42, as shown in 128. The resulting geometry data for the discontinuity 42 may be used to determine the depth (or height) and/or calculate the volume of the discontinuity 42. The device 20 may apply tolerance limits to the measurement results, as shown in 130, and present the results on the display 24 for the user, as shown in 132. The device 20 may log the results to a database for long-term storage, as shown in 134.

Figure 7:
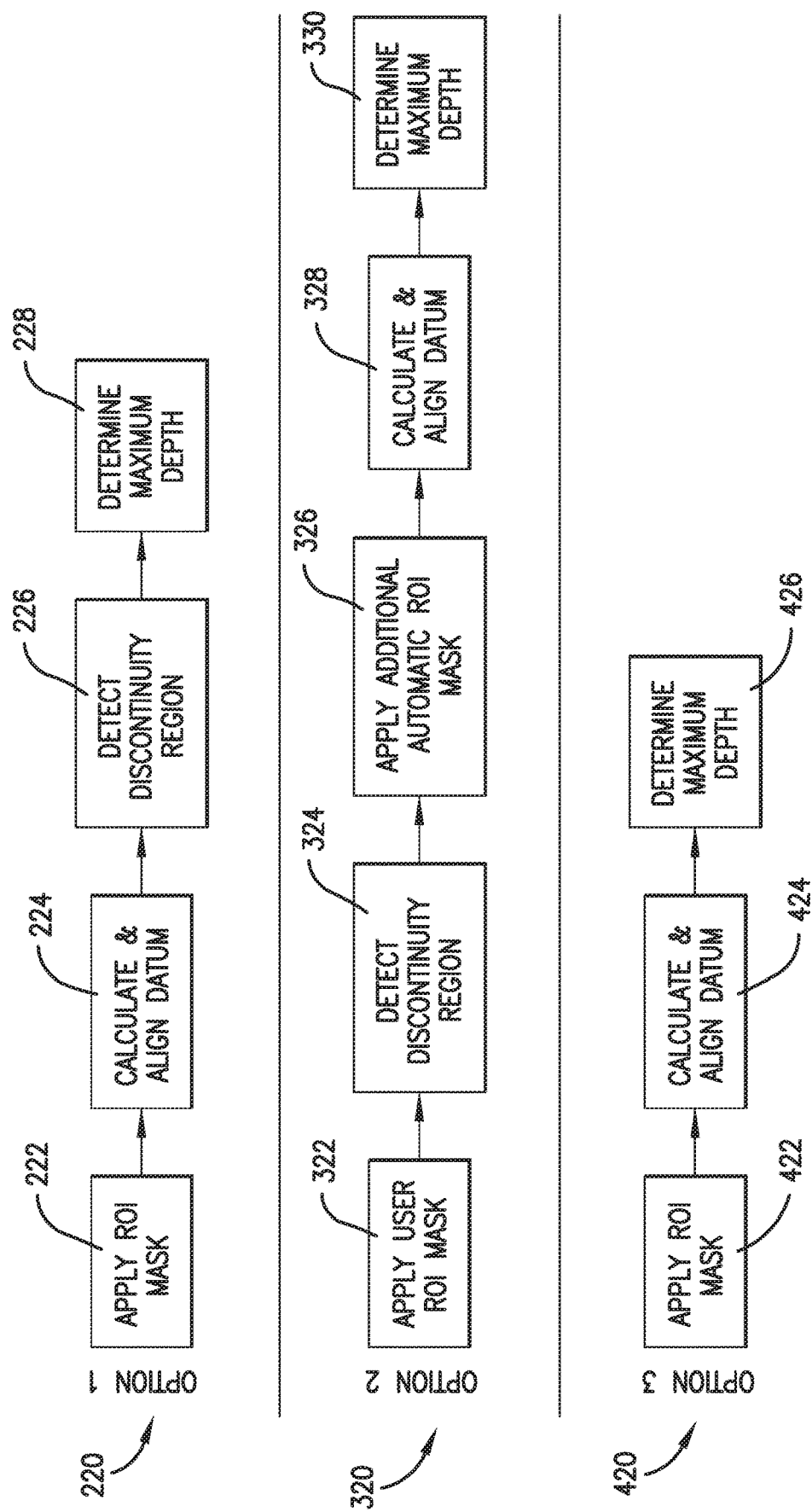
FIG. 7 is alternative first, second, and third flowcharts of steps performed by a processing component of the device during operation.

Referring also to FIG. 7, three exemplary workflows 220, 320, 420 are shown for the data processing performed by the processing component 22 to determine the depth of the discontinuity 42 within a region of interest (ROI) on the surface 38 of the piece 36. In the first exemplary workflow 220, the device 20 applies an ROI mask, as shown in 222; calculates and aligns a point on the surface 38, as shown in 224; detects the discontinuity 42 within the ROI, as shown in 226; and determines the true depth of the discontinuity 42, as shown in 228. In the second exemplary workflow 320, the device 20 applies a user ROI mask, as shown in 322; detects the discontinuity 42 within the ROI, as shown in 324; applies an additional automatic ROI mask, as shown in 326; calculates and aligns a point on the surface 38, as shown in 328; and determines the true depth of the discontinuity 42, as shown in 330. In the third exemplary 420 workflow, the device 20 applies an ROI mask, as shown in 422; calculates and aligns a point on the surface 38, as shown in 424; and determines the true depth of the discontinuity 42, as shown in 426.

Figure 8:
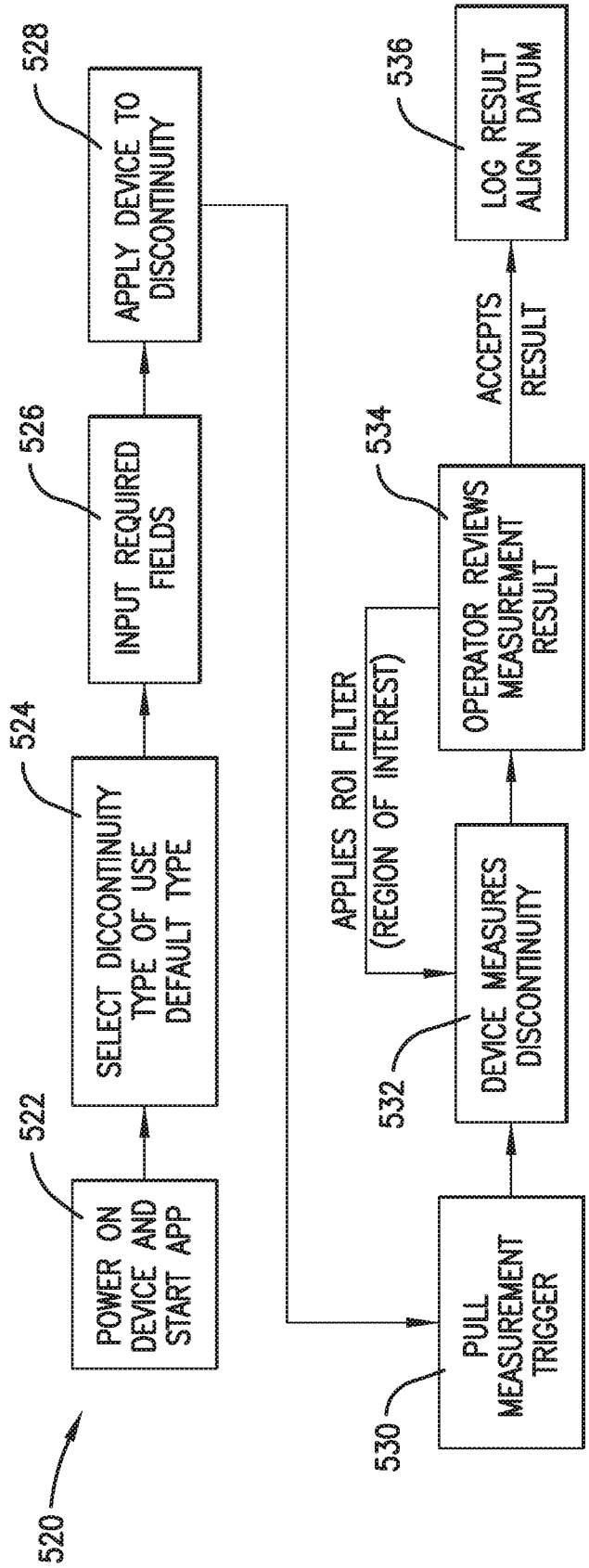
FIG. 8 is a flowchart of steps performed by a user of the device during operation.

Referring also to FIG. 8, an exemplary workflow 520 is shown for the user of the device 20. The user turns on the device 20, as shown in 522; selects the type of discontinuity to measure or uses the default type, as shown in 524; inputs required data fields, as shown in 526; applies the device to the discontinuity 42, as shown in 528; and activates the trigger 26, as shown in 530. The device 20 then measures the discontinuity 42, as shown in 532, in accordance with a workflow such as one of those shown in FIG. 7. The user reviews the results of the measurement, as shown in 534. If the user is satisfied with the measurement, the user accepts the measurement and logs the results, as shown in 536. If the user finds that the device 20 did not automatically detect the feature in which the user was interested or if the user is otherwise dissatisfied with the measurement, the user can apply an ROI mask and have the device 20 repeat the measurement by returning to 532.

Table 1, below, shows exemplary data fields that may be populated. Some of the fields may be entered by the user in the Input Required Fields step 526 of the workflow 520. Other fields may be automatically populated by the device 20. Some or all of these data fields may be included in the logged results.

| Data fields | | |
| --- | --- | --- |
| Field | Example Value | Provided by |
| Operator ID | 2618693 | Operator Badge/RFID |
| Operator Name | John doe | Operator ID |
| Measurement Type | Scratch | Operator |
| Measured Part/Assembly | 114A12345-01 | Operator |
| Work Order | 1111111 | Operator |
| Station Location | Station 245 | Operator |
| Buttock Line | BL 120 | Operator |
| Water Line | WL 0 | Operator |
| Discontinuity Depth | 0.0012" | Device |
| Discontinuity Length | 0.304" | Device |
| Discontinuity Width | 0.013" | Device |
| Comments Text Box | Operators Qualitative Analysis | Operator |
| Aircraft Coordinate X | 245.34 | Indoor Positioning System |
| Aircraft Coordinate Y | 128.5 | Indoor Positioning System |
| Aircraft Coordinate Z | 0.123 | Indoor Positioning System |

Figure 9:
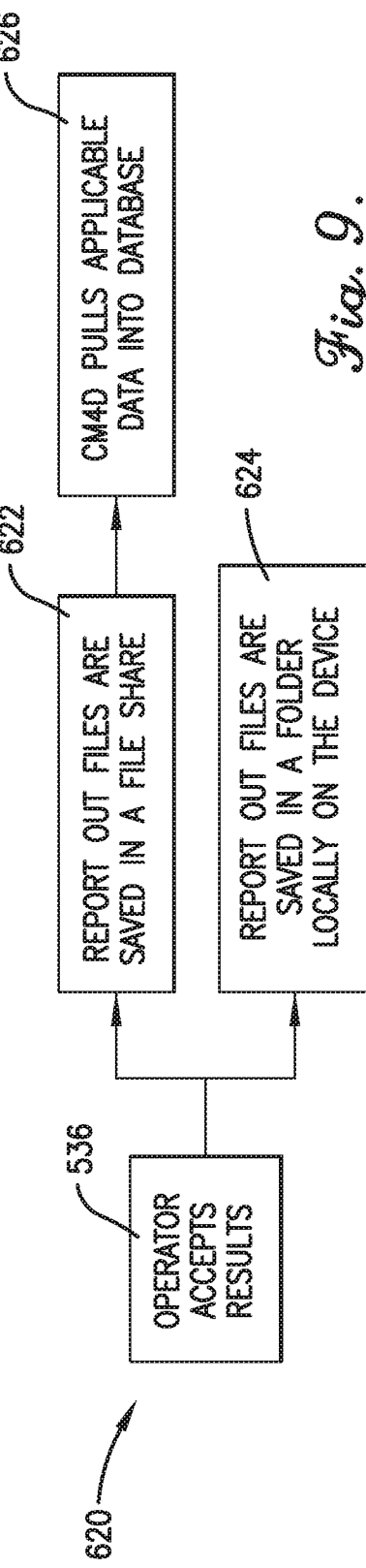
FIG. 9 is a flowchart of steps involved in managing data produced by the device.

Referring also to FIG. 9, an exemplary dataflow 620 is shown which may occur once the user accepts the measurement in step 536. The data may be stored and managed locally on the device 20, using a folder and file structure, as shown in 622. In particular, each measurement operation may have its own ASCII text file containing the results of the operation. The data may also be exported as a .PDF or .JPG file of the results so that the results may be attached to a report if desired. Additionally or alternatively, the data or a copy of the data may be stored in and managed from a shared folder location, as shown in 624. The device 20 may access the shared folder location via a wireless connection such as ADVMOB or SWPA10. The data may be accessed over the wireless connection, consumed, and managed by either CM4D or a Quality database, as shown in 626. In one implementation, the device 20 may record several data files, including six image files of the discontinuity capture (raw format), one image file of the discontinuity 3D profile (GelSight format), one image file of the discontinuity 3D profile (jpeg format), one PDF file of the results report, and one .csv file of the captured data fields (user inputs, depth measurement, etc.).

Figure 10:
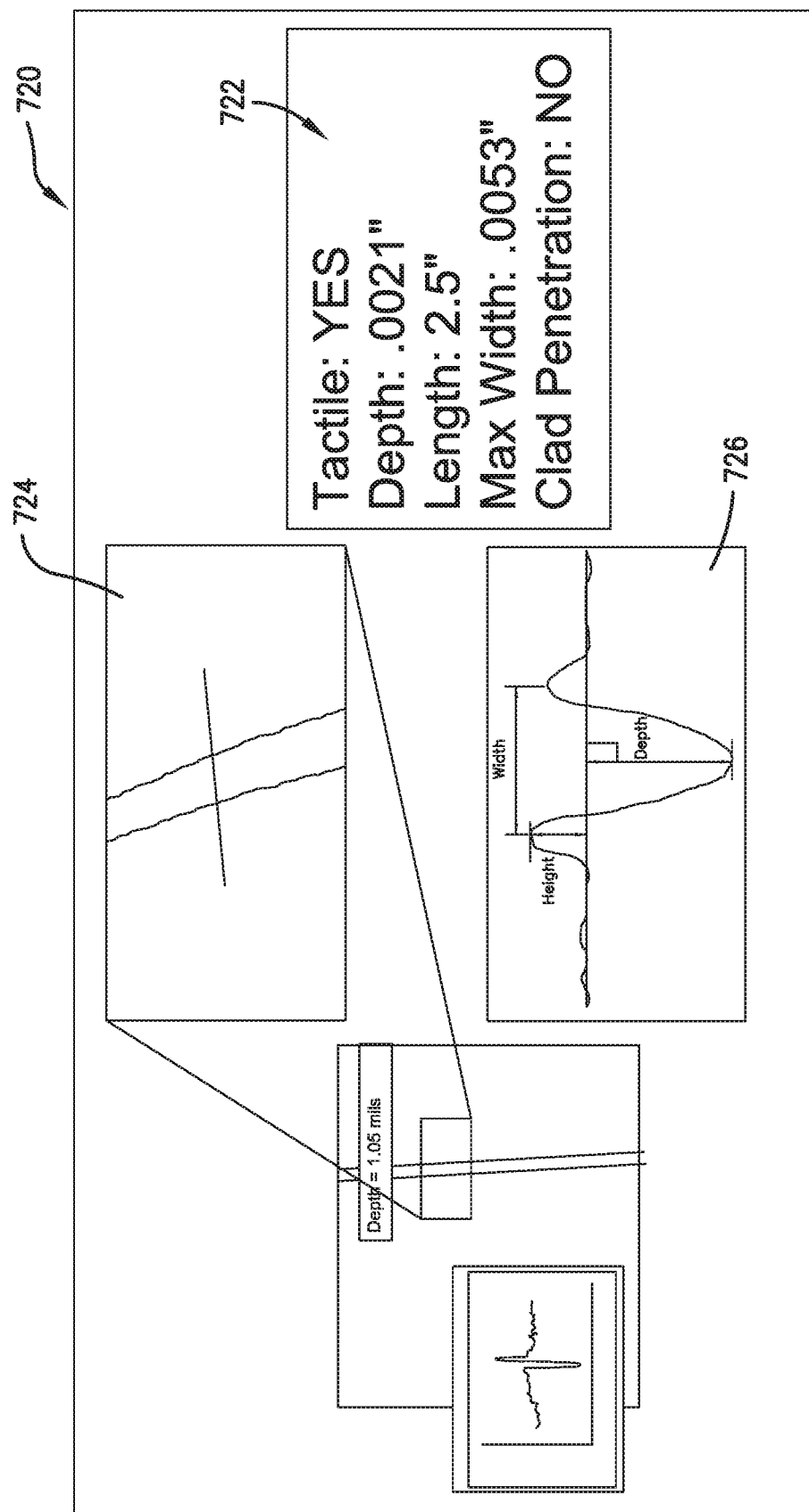
FIG. 10 is a depiction of a report presented on a display component of the device.

Referring also to FIG. 10, an exemplary output report 720 is shown which may be presented on the display 24 for the user. Broadly, the report 720 may include the true depth 722 of the discontinuity as well as other desired descriptive metrics such as whether the discontinuity 42 is tactile, the length and width of the discontinuity 42, and whether the discontinuity 42 penetrated the cladding. In on embodiment, the report 720 may include a visualization of a physical profile of the discontinuity 42, which may include a 3D depiction 724 and/or a 2D depiction 726 of the surface topography of the discontinuity 42. The report 720 may include a "Go/No-Go" or pass / fail indication based on a comparison of the measurement to a maximum allowable discontinuity (i.e., either the depth of the measured discontinuity 42 is less than a maximum acceptable depth or it is not).

FIGS. 11-18 concern specific implementations which affect one or more components of the device. Unless noted, the other components and/or functionalities of the devices incorporating the affected components may be otherwise substantially similar or identical to the embodiments and implementations described above. Further, any feature of any embodiment or implementation may be incorporated into any other embodiment or implementation, as desired.

Referring to FIG. 11, a first alternative implementation of the device 1120 is shown broadly comprising the TPC and/or base material sensor 1132, the element 1146, a handle 1150, a plunger 1152, a return spring 1154, a chamber 1156, a camera 1158, one or more light sources 1160, and a seal 1162. The TPC and/or base material sensor 1132 may be the eddy current sensor discussed above to determine the thickness of the TPC 1140. The TPC and/or base material sensor 1132 may be incorporated into a contact foot. The element 1146 may be the membrane discussed above being opaque and having a uniform reflectivity. The handle 1150 and the plunger 1152 may be configured to allow for increasing a pressure within the chamber 1156 and thereby forcing the element 1146 into closer contact with the piece 1136. More specifically, a user may push down on the handle 1150 to move the plunger 1152 into the chamber 1156, which increases the pressure within the chamber 1156 and on the chamber-side of the element 1146, thereby forcing the element 1146 into more conforming contact with the piece 1136 and into the discontinuity 1142. The one or more light sources 1160 may then illuminate the element 1146 from one or more angles, including illuminating the discontinuity 1142 in the surface 1138 of the piece 1136, and the camera 1158 may capture one or more images, which may be processed as described above. Once the images are taken and the user ceases pushing on the handle 1150, the return spring 1154 returns the plunger 1152 to its original position, which returns the pressure in the chamber 1156 to its original value.

Referring to FIG. 12, a second alternative implementation of the device 1220 is shown broadly comprising the TPC and/or base material sensor 1232, the element 1246, a vacuum line 1250, the chamber 1256, the camera 1258, the one or more light sources 1260, and the seal 1262. The TPC and/or base material sensor 1232 may be the eddy current sensor discussed above to determine the thickness of the TPC 1240. The TPC and/or base material sensor 1232 may be incorporated into the contact foot. The element 1246 may be the membrane discussed above being opaque and having a uniform reflectivity. The vacuum line 1250 may be configured to allow for automatically removing air from the chamber 1256 for the reasons discussed above. More specifically, a user may activate a vacuum pump (not shown) which removes air from the chamber 1256 via the vacuum line 1250. The seal 1262 prevents air from returning to the chamber 1256, thereby creating at least a partial vacuum in the chamber 1256. The one or more light sources 1260 may illuminate the element 1246 from one or more angles, including the discontinuity 1242 in the surface 1238 of the piece 1236, and the camera 1258 may capture one or more images, which may be processed as described above.

Referring to FIG. 13, a third alternative implementation of the device 1320 is shown broadly comprising the TPC and/or base material sensor 1332, the element 1346, the camera 1358, and the one or more light sources 1360. The TPC and/or base material sensor 1332 may be the eddy current sensor discussed above to determine the thickness of the TPC 1340. The TPC and/or base material sensor 1332 may be incorporated into the contact foot. The element 1346 may be the membrane discussed above being opaque and having a uniform reflectivity. The one or more light sources 1360 may illuminate the element 1346 from one or more angles, including the discontinuity 1342 in the surface 1338 of the piece 1336, and the camera 1358 may capture one or more images, which may be processed as described above.

Referring to FIG. 14, a fourth alternative implementation of the device 1420 is shown broadly comprising the conforming element 1446 in the form of a lubricant or other fluid 1447 and an optically clear gel 1448, the camera 1458, and the one or more light sources 1460. The fluid 1447 may be opaque and have a uniform reflectivity, and the gel 1448 may press against the fluid 1447 to create a uniform layer of the fluid 1447 and to eliminate air bubbles, thereby achieving an effect substantially similar or identical to a membrane. The one or more light sources 1460 may illuminate the fluid 1447 through the gel 1448 from one or more angles, including the discontinuity 1442 in the surface 1438 of the piece 1436, and the camera 1458 may capture one or more images, which may be processed as described above.

Referring to FIG. 15, a fifth alternative implementation of the device 1520 is shown broadly comprising the camera 1558, and a plurality of light sources 1560. The membrane (or, e.g., the fluid-elastomer substitute) may or may not be present in this implementation. The plurality of light sources 1560 may be arranged so as to illuminate the ROI from a plurality of different angles, including the discontinuity 1542 in the surface 1538 of the piece 1536, and the camera 1558 may capture one or more images, which may be processed as described above. Given a sufficient number of light sources 1560 to overcome issues of glare and uniformity of illumination, the membrane may not be needed.

Referring to FIG. 16, a sixth alternative implementation of the device 1620 is shown broadly comprising the TPC 1640, the camera 1658, and the plurality of light sources 1660. Both the membrane (or, e.g., the fluid-elastomer substitute) and the TPC and/or base material sensor may or may not be present in this implementation. The TPC 1640 may be transparent to x-rays. The plurality of light sources 1660 may emit x-rays and may be arranged so as to illuminate the ROI from a plurality of different angles, including the discontinuity 1642 in the surface 1638 of the piece 1636. The camera 1658 may be configured for x-ray imaging, and may capture one or more x-ray images, which may be processed as described above. The TPC and/or base material sensor may be unnecessary because the x-rays will penetrate the TPC 1640 and allow for determining the true depth of the discontinuity 1642 without otherwise accounting for the thickness of the TPC 1640. And again, given a sufficient number of light sources 1660 to overcome issues of glare and uniformity of illumination, the membrane may not be needed.

Referring to FIG. 17, a seventh alternative implementation of the device 1720 is shown broadly comprising the TPC 1740, the camera 1758, and the plurality of light sources 1760. The membrane (or, e.g., the fluid-elastomer substitute) may or may not be present in this implementation. The TPC 1740 may be optically clear, or at least clear at a particular wavelength or range of wavelengths emitted by the plurality of light sources 1760. The plurality of light sources 1760 may be arranged so as to illuminate the ROI from a plurality of different angles, including the discontinuity 1742 in the surface 1738 of the piece 1736, and the camera 1758 may capture one or more images, which may be processed as described above. The TPC and/or base material sensor may be unnecessary because the wavelengths emitted by the plurality of light sources 1760 will penetrate the clear TPC 1740 and allow for determining the true depth of the discontinuity 1742 without otherwise accounting for the thickness of the TPC 1740. And again, given a sufficient number of light sources 1760 to overcome issues of glare and uniformity of illumination, the membrane may not be needed.

Referring to FIG. 18, an eighth alternative implementation of the device 1820 is shown broadly comprising the conforming element 1846, the camera 1858, and the one or more light sources 1860. The conforming element 1846 may be substantially any thin layer such as a gel, film, sheet, membrane, or other layer that is opaque, has uniform reflectivity, and is sufficiently thin and flexible that it conforms to the surface of the ROI on contact. For example, the thin layer may be gold leaf, silver leaf, or aluminum leaf.

The one or more light sources 1860 may illuminate the thin layer element 1846 from one or more angles, including the discontinuity 1842 in the surface 1838 of the piece 1836, and the camera 1858 may capture one or more images, which may be processed as described above.

Referring to FIG. 19, a ninth alternative implementation of the device 1920 is shown broadly comprising the TPC 1940, the camera 1958, and one or more light sources 1960. Both the membrane (or, e.g., the fluid-elastomer substitute) and the TPC and/or base material sensor may or may not be present in this implementation. The color of the TPC 1940 may vary with the thickness of the TPC 1940, with darker color being associated with more thickness and lighter color being associated with less thickness. The light sources 1960 may emit white light to illuminate the ROI from one or more angles, including the discontinuity 1942 in the surface 1938 of the piece 1936, and the camera 1958 may capture one or more images, which may be processed as described above with the added steps of accounting for color and associating color with thickness. The TPC and/or base material sensor may be unnecessary because the color of the TPC 1940 allows for determining the thickness of the TPC 1940.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A device for measuring and evaluating a profile of a surface of a structure, the device comprising:
    a conforming membrane having two sides and applied over first and adjacent second surface areas of the surface of the structure and conforming to the first and adjacent second surface areas and making more uniform a reflectivity difference and a color difference between the first and adjacent second surface areas;
    a pressurization source creating a pressure differential between the two sides of the conforming membrane and urging the conforming membrane toward the structure and increasing conformance of the conforming membrane to the first and adjacent second surface areas;
    one or more lights illuminating the first and adjacent second surface areas from one or more angles;
    a digital camera capturing one or more images of the first and adjacent second surface areas illuminated by the one or more lights; and
    an electronic processor generating geometry data regarding the profile of the first surface area based on the one or more images of the first surface area, performing an analysis of the geometry data, and visually communicating a result of the analysis on a display.

2. The device of claim 1, wherein the one or more lights are a plurality of lights arranged to illuminate the first and adjacent second surface areas from a plurality of angles.

3. The device of claim 1, wherein the profile of the first surface area comprises a depth.

4. The device of claim 1, wherein the profile of the first surface area comprises a height.

5. The device of claim 1, further comprising a thickness sensor generating thickness data regarding a thickness of the first surface area, and the analysis comprises the geometry data and the thickness data.

6. The device of claim 5, wherein the thickness sensor also measures an average thickness of the adjacent second surface area.

7. The device of claim 6, wherein the analysis performed by the electronic processor comprises determining a true depth of the first surface area relative to the adjacent second surface area.

8. The device of claim 7, wherein the analysis performed by the electronic processor further comprises determining a criticality of the first surface area by subtracting the true depth of the first surface area from the average thickness of the adjacent second surface area to produce a criticality result.

9. The device of claim 8, wherein determining the criticality of the first surface area comprises comparing the criticality result to a pre-established maximum criticality value.

10. The device of claim 8, wherein determining the criticality of the first surface area further comprises considering a nature of the structure and a force that the structure may experience during use.

11. The device of claim 1, the electronic processor, based on the analysis, automatically making a determination of whether the first surface area should be repaired, and visually communicating the determination on the display.

12. The device of claim 1, wherein the geometry data comprises a plurality of data points forming a three-dimensional point cloud providing three-dimensional topography data of the first surface area.

13. The device of claim 1, wherein the result of the analysis communicated on the display comprises a cross-sectional elevation view of the first surface area.

14. The device of claim 1, wherein the conforming membrane is an elastomeric membrane.

15. The device of claim 1, further comprising a position sensor generating position data regarding a location of the first surface area on the structure.

16. The device of claim 15, wherein the position sensor is a wireless three-dimensional positional tracker determining the location of the first surface area based on signals received from a plurality of local transmitters.

17. A device for measuring and evaluating a profile of a surface of a structure, the device comprising:
    a conforming membrane having two sides and applied over first and adjacent surface areas of the surface of the structure, wherein the first surface area contains a surface discontinuity, and conforming to the first and adjacent second surface areas and making more uniform a reflectivity difference and a color difference between the first and adjacent second surface areas;
    a pressurization source creating a pressure differential between the two sides of the conforming membrane and urging the conforming membrane toward the structure and increasing conformance of the conforming membrane to the first and adjacent second surface areas;
    one or more lights illuminating the first and adjacent second surface areas from one or more angles;
    a digital camera capturing one or more images of the first and adjacent second surface areas illuminated by the one or more lights; and
    an electronic processor—
        generating geometry data regarding the profile of the first surface area based on the one or more images of the first surface area,
        performing an analysis of the geometry data, the analysis comprising— determining a true depth of the first surface area relative to the adjacent second surface area, determining a criticality of the first surface area by subtracting the true depth of the first surface area from an average thickness of the adjacent second area to produce a criticality result, and visually communicating a result of the analysis, comprising the criticality result, on a display.

18. The device of claim 17, the electronic processor, based on the analysis, automatically making a determination of whether the first surface area should be repaired, and visually communicating the determination on the display.

19. The device of claim 18, further comprising a position sensor generating position data regarding a location of the first surface area on the structure, wherein the position sensor is a wireless three-dimensional positional tracker determining the location of the first surface area based on signals received from a plurality of local transmitters.

20. A device for measuring and evaluating a profile of a surface of a structure, the device comprising:

a conforming membrane having two sides and applied over first and adjacent second surface areas, wherein the first surface area contains a surface discontinuity, and conforming to the first and adjacent second surface areas and making more uniform a reflectivity difference and a color difference between the first and adjacent second surface areas;

a pressurization source creating a pressure differential between the two sides of the conforming membrane and urging the conforming membrane toward the structure and increasing conformance of the conforming membrane to the first and adjacent second surface areas;

one or more lights illuminating the first and adjacent second surface areas from one or more angles;

a digital camera capturing one or more images of the first and adjacent second surface areas illuminated by the one or more lights; and a thickness sensor generating thickness data regarding a thickness of the first surface area;

an electronic processor— generating geometry data regarding a geometry of the profile of the first surface area based on the one or more images of the first surface area, performing an analysis of the geometry data, the analysis comprising— determining a true depth of the first surface area relative to the adjacent second surface area, determining a criticality of the first surface area by subtracting the true depth of the first surface area from an average thickness of the adjacent second surface area to produce a criticality result, wherein determining the criticality of the first surface area comprises comparing the criticality result to a pre-established maximum criticality value and considering a nature of the structure and a force that the structure may experience during use, and visually communicating a result of the analysis on a display.

* * * * *